Nov. 13, 1962  P. J. LONG, JR  3,063,701
SHOCK ABSORBER WITH AIR BOOSTER SPRING
Filed Aug. 30, 1960

INVENTOR.
Paul J. Long, Jr.
BY
His Attorney

United States Patent Office 3,063,701
Patented Nov. 13, 1962

3,063,701
SHOCK ABSORBER WITH AIR BOOSTER SPRING
Paul J. Long, Jr., Dayton, Ohio, assignor to General Motors Corporation, Detroit, Mich., a corporation of Delaware
Filed Aug. 30, 1960, Ser. No. 52,881
3 Claims. (Cl. 267—64)

This invention relates to a combination shock absorber and supplementary air spring unit assembly adapted to be placed between the sprung mass and the unsprung mass of a vehicle in the same position normally occupied by a conventional shock absorber as disposed adjacent the main suspension spring for the vehicle, the supplementary air spring unit being adapted to said the main suspension spring in support of the sprung mass of the vehicle on the unsprung mass when the supplementary air spring unit is pressurized with a suitable fluid, such as air.

The combination shock absorber and supplementary air spring unit assembly may be positioned adjacent each of the respective main suspension springs for a vehicle, but the combination unit is used mainly adjacent the two rear springs of the vehicle so that the auxiliary air spring unit, when pressurized, can aid the main suspension springs at the rear of the vehicle to prevent sagging of the vehicle. The air spring on the shock absorber is constructed and arranged in a manner that it will not cause any substantial change in ride effect normally engineered into the main spring suspension for the vehicle. However, the supplementary air spring unit can be supplied with fluid under pressure, such as air or other suitable gas, whenever a heavier-than-normal load is carried by the vehicle, or any load that tends to cause the rear end of the vehicle to sag, so that the main suspension spring of the vehicle will be helped in its suspension during the period when the heavy load is being carried by the vehicle whereby to eliminate or at least resist "bottoming" of the vehicle and to maintain the vehicle in a more level condition relative to the road.

To conserve space, and provide an air spring unit in a minimum area, the air spring is constructed in the form of an elongated tubular member forming a wall of the air spring chamber that is adapted to be pressurized.

However, there is a tendency for the flexible tubular wall of the air spring to "balloon out" thereby requiring it to take more space than is desired, rendering it more susceptible to rupture, and also tending to resist extension movement of the shock absorber.

It is therefore an object of this invention to provide a supplementary air spring unit assembly for a shock absorber wherein a major wall portion of the supplementary air spring unit that forms the pressure receiving chamber of the unit comprises a tubular rigid wall and a minor portion of the pressure receiving chamber of the supplementary air spring unit comprises a flexible tubular wall that has just sufficient axial length to allow for reciprocal movement of the rigid wall portion of the supplementary air spring unit through the full stroke of reciprocation of the shock absorber piston in its cylinder.

Further ojects and advantages will become apparent from the drawings and the following description.

Figures 1, 2:
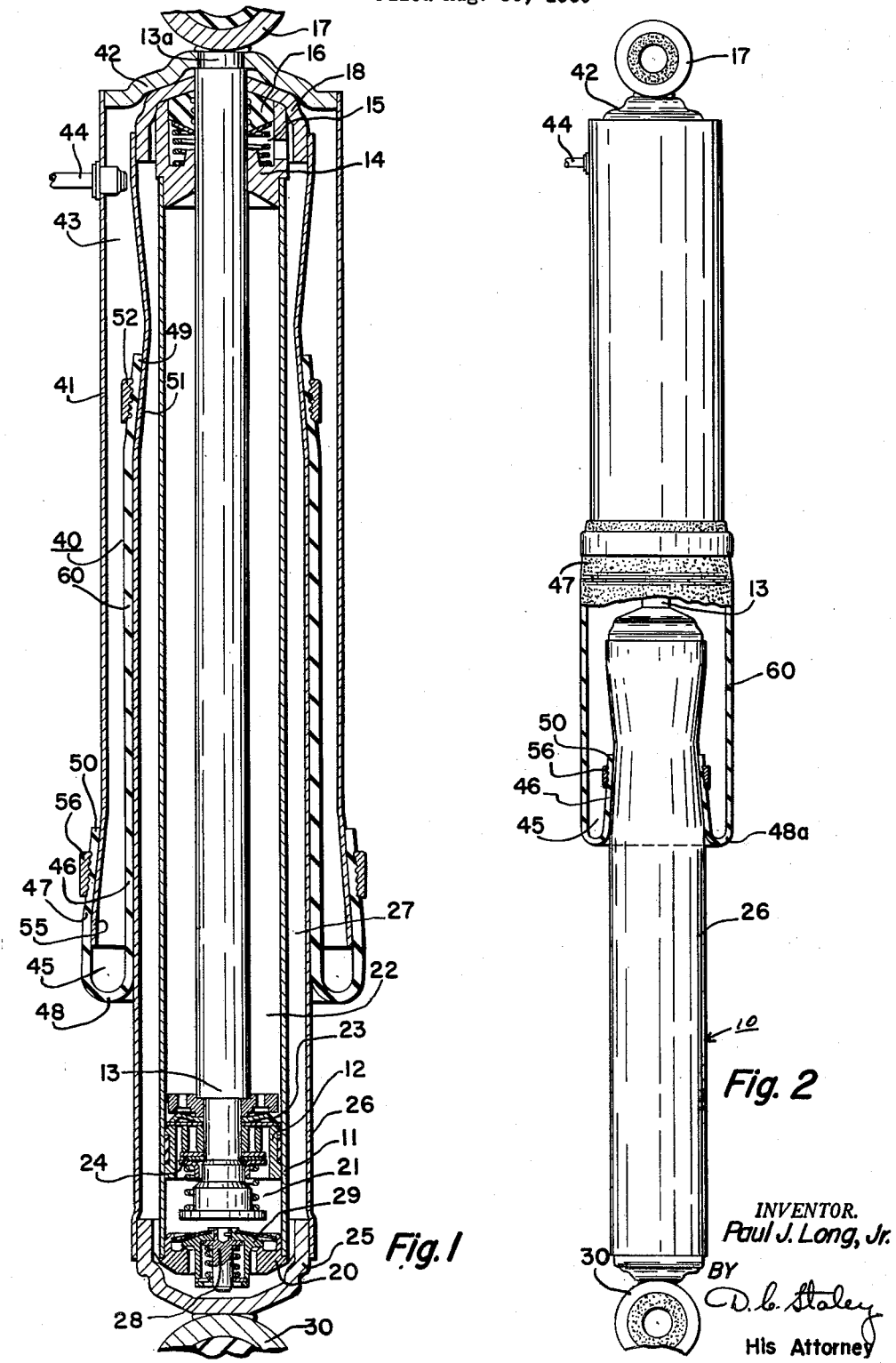
FIGURE 1 is a vertical cross-sectional view of a shock absorber incorporating features of this invention shown in the fully collapsed position of the shock absorber.
FIGURE 2 is an elevational view, partially in cross section, illustrating the shock absorber of FIGURE 1 in fully extended position.

In this invention, in FIGURE 1, there is illustrated a shock absorber and air spring unit assembly that is adapted to be placed between the sprung mass and the unsprung mass of a vehicle in the same location that a conventional direct-acting shock absorber normally occupies between the sprung mass and the unsprung mass of a vehicle adjacent a main suspension spring for the vehicle. The shock absorber will function in its normal manner to damp movements of the sprung and unsprung masses of the vehicle relative to one another without any substantial interference from the air spring unit portion of the assembly either when the air spring is pressurized or is not pressurized. When the air spring unit of the combination shock absorber and air spring unit assembly is pressurized with a pressure fluid, such as air or other suitable gas, the air spring will aid support of the sprung mass of the vehicle on the unsprung mass so that a greater load can be carried by the vehicle without causing sagging of the vehicle relative to the road. The combination shock absorber and air spring unit assembly can be used at both the front and the rear of the vehicle, but preferably the assemblies are positioned only at the rear of the vehicle adjacent each of the rear springs to avoid rear end sagging of the vehicle when heavy loads are carried in the vehicle.

The shock absorber 10 consists of a pressure cylinder 11 having a valved piston 12 carried on the end of a reciprocating rod 13. The reciprocating rod 13 extends through a rod guide member 14 at one end of the cylinder 11, the rod guide member 14 having a rod seal chamber 15 that receives a rod seal 16 engaging the rod and sealing against loss of hydraulic fluid from within the shock absorber pressure cylinder 11. The projecting end of the rod 13 carries a fitting 17 adapted for attachment of the rod to the sprung mass or chassis of the vehicle to attach this end of the shock absorber to the vehicle. The seal chamber 15 is closed by a cap member 18 that also holds the rod seal 16 within the chamber 15.

The bottom end of the cylinder 11 is closed by a base valve structure 20 so that a compression chamber 21 is formed between the base valve 20 and the piston 12. A rebound chamber 22 is formed between the piston 12 and the rod guide 14.

The piston 12 is provided with a compression control valve 23 on one side of the piston to regulate flow of hydraulic fluid from the chamber 21 into the chamber 22 on movement of the piston 12 toward the base valve 20, exces hydraulic fluid being delivered through the base valve into the reservoir chamber. On the opposite side of the piston 12 there is provided the rebound valve 24 that controls flow of hydraulic fluid from chamber 22 into chamber 21 when the piston moves upwardly away from the base valve 20. The base valve 20 is carried in a closure cap 25 that is secured within one end of a reservoir tube 26 surrounding the cylinder tube 11 and coaxially spaced therefrom. The upper end of the reservoir tube 26 is fixedly attached to the closure cap 18, thereby providing a closed fluid reservoir space 27 between the cylinder tube 11 and the reservoir tube 26.

The base valve 20 has a valve member 28 that controls flow of hydraulic fluid from the compression chamber 21 into the reservoir chamber 27 on movement of the piston 12 toward the base valve 20. The base valve also includes a valve member 29 that provides for relatively free flow of hydraulic fluid from the reservoir chamber 27 back into the compression chamber 21 on movement of the piston 12 away from the base valve. The closure cap 25 carries a fitting 30 adapted for attaching the lower end of the shock absorber to the unsprung mass, or wheel and axle structure, of the vehicle.

The air spring unit assembly 40 includes a rigid tubular wall 41 that is secured at its upper end to a wall member 42 in the form of a cap, the juncture between the walls 41 and 42 being a fluid-tight joint. The cap 42 is carried on the projecting end of the rod 13, being fitted on a reduced diameter portion 13a, the juncture between the rod portion 13a and the cap 42 being a fluid-tight joint. The tubular wall 41 has an axial length that is at least equal to the stroke of reciprocation of the piston 12 in the cylinder 11 for reasons which will become apparent hereinafter. The wall 41 is coaxial with the reservoir tube 26 and is spaced therefrom to form a chamber space 43 that is adapted to be pressurized with fluid under pressure through a fitting 44. The tubular member 41 therefore has a closed top wall 42 and an open bottom wall, the bottom end of the tube 41 being a free end and in spaced relation to the reservoir tube 26, as shown in FIGURE 1.

The open bottom end of the chamber space 43 is closed by a resilient tubular wall unit 45 that has an inner tubular wall portion 46 and an outer tubular wall portion 47, both wall portions being of resilient flexible material, such as fabric reinforced rubber or other rubber-like material. These wall portions 46 and 47 are connected by a return bend portion 48 integral with the wall portions 46 and 47 and is formed by these portions on relative reciprocation between the inner and outer wall portions. The inner and outer wall portions 46 and 47 therefore have end portions 49 and 50 that extend toward the same end of the tubular wall structure 45, as shown in FIGURE 1 of the drawings.

The reservoir tube 26 has a reduced diameter portion 51 closely adjacent the rod seal end of the shock absorber structure that is in the form of a truncated cone. The inner wall portion 46 sleeves over the reservoir tube 26 and has its free end 49 positioned on the truncated wall portion 51 of the reservoir tube and retained thereon by a nonexpansible metal ring 52.

The outer wall portion 47 of the tubular wall unit 45 has its free end 50 placed upon an enlarged wall portion 55 at the bottom of the rigid tubular member 41 that is in the form of a truncated cone. The end portion 50 of the unit 45 is secured to the wall portion 55 by a nonelastic metal ring 56. It will be appreciated that when pressurized fluid is admitted into the pressure receiving chamber 43, any tendency of the fluid to move the tubular wall unit 45 axially of the shock absorber out of the pressure receiving chamber 43 will tend to cause the wall portions 49 and 50 to be gripped more securely by the nonelastic rings 52 and 56 and thereby more securely seal the end wall portions 50 and 49 to the wall portions 55 and 51 respectively, in proportion to the pressure of the fluid contained in the pressure receiving chamber 43.

In FIGURE 1 the shock absorber is shown in fully collapsed position, whereas in FIGURE 2 the shock absorber is shown in fully extended position. In FIGURE 1 it will be noted that the return bend portion 48 between the inner and outer wall portions 46 and 47 is closely adjacent the end wall portion 55 of the rigid tubular member 41, whereas in FIGURE 2 the return bend portion 48a is closely adjacent the attachment of the wall portion 49 on the reservoir tube 26. Thus, the unattached wall portion 60 of the resilient tubular wall unit 45 has an axial length that is not less than the reciprocal stroke of the piston 12 in the cylinder 11 and is not substantially greater than the said reciprocal stroke except for the added portion required to form the return bend portion 48a and the attachments formed by the short end wall portions 49 and 50.

When the shock absorber is in fully collapsed position, as shown in FIGURE 1, with the return bend portion 48 being closely adjacent the end portion 55 of the tubular wall 41, the entire unattached wall portion 60 of the unit 45 is supported on the metal reservoir tube 46 at a time when the pressurized fluid in the pressure receiving chamber 43 will be at its maximum established by the full and complete collapsing of the shock absorber, which position represents the maximum stroke of reciprocation of the shock absorber.

When the shock absorber is in the fully extended position, as shown in FIGURE 2, there will only be the unattached wall portion 60 that is substantially equal to one-half the stroke of reciprocation of the shock absorber that will be unsupported by a rigid wall, rather than having the unsupported wall portion 60 extend to a position immediately adjacent the cap 42, which at least doubles the unsupported length of the resilient tubular wall 60. Thus the shorter length of unsupported wall 60 will provide for less chance of rupture, and less chance of damage by stone bruise, or other cutting object, since a considerably lesser length of unsupported tubular wall is exposed even under the maximum extended position of the shock absorber, substantially no unsupported wall being exposed to stone bruise or cut when the shock absorber is in fully collapsed position as shown in FIGURE 1.

While the embodiments of the present invention as herein disclosed constitute preferred forms, it is to be understood that other forms might be adopted.

What is claimed is as follows:

1. A shock absorber and air spring unit assembly, comprising, a hydraulic direct-acting tubular shock absorber including a tubular pressure cylinder, a piston disposed in said pressure cylinder slidably fitting the same and having ports providing for hydraulic fluid flow through the piston between cylinder chambers at opposite sides of the piston during reciprocation thereof in said cylinder, valve means on each of opposite sides of said piston to control hydraulic fluid flow from one side of the piston to the other, a reservoir tube concentrically surrounding said cylinder tube in spaced relation thereto and forming therewith a reservoir space, valve means closing one end of said pressure cylinder and providing for hydraulic fluid flow in both directions between said pressure cylinder and said reservoir space, wall means closing the end of said reservoir tube adjacent said pressure cylinder valve means, a piston rod connected to said piston and extending beyond the opposite ends of said tubes, wall means closing said opposite ends and through which said rod slidably extends, an elongated rigid tubular member having a closure wall at one end thereof secured to said extending end of said rod by said closure wall and positioned concentrically around said reservoir tube with the opposite end of said tubular member being an open end and with the tubular member spaced from said reservoir tube to provide therewith an open ended chamber, said rigid tubular member having an axial length at least equal to the stroke of reciprocation of said piston in said pressure cylinder but not greater than the axial length of said reservoir tube, and a resilient tubular wall unit having an inner tubular wall sleeved over said reservoir tube with the free end thereof attached to said reservoir tube in fluid-tight engagement and an outer tubular wall sleeved over said open end of said tubular member with the free end thereof attached to said tubular member in fluid-tight engagement with said inner wall and said outer wall integrally connected by a rolling return bend wall portion formed by the inner and the outer wall on relative reciprocation therebetween whereby to close said open end of said chamber for receiving therein fluid under pressure, said resilient tubular wall unit having an unsupported tubular wall portion between said attached ends thereof with the shock absorber in full extended position that engages said reservoir tube in reciprocal rolling engagement and which has an axial length that is not less than the reciprocal stroke of said piston in said pressure cylinder and greater than said stroke only by an axial length sufficient to establish said rolling return bend portion between said inner and outer tubular walls and said attachments to said inner and outer walls respectively.

2. A shock absorber and air spring unit assembly, comprising, a hydraulic direct-acting tubular shock absorber including a tubular pressure cylinder, a piston disposed in said pressure cylinder slidably fitting the same and having ports providing for hydraulic fluid flow through the piston between cylinder chambers at opposite sides of the piston during reciprocation thereof in said cylinder, valve means on each of opposite sides of said piston to control hydraulic fluid flow from one side of the piston to the other, a reservoir tube concentrically surrounding said cylinder tube in spaced relation thereto and forming therewith a reservoir space, valve means closing one end of said pressure cylinder and providing for hydraulic fluid flow in both directions between said pressure cylinder and said reservoir space, wall means closing the end of said reservoir tube adjacent said pressure cylinder valve means, a piston rod connected to said piston and extending beyond the opposite ends of said tubes, wall means closing said opposite ends and through which said rod slidably extends, an elongated rigid tubular member having a closure wall at one end thereof secured to said extending end of said rod by said closure wall and positioned concentrically around said reservoir tube with the opposite end of said tubular member being an open end and with the tubular member spaced from said reservoir tube to provide therewith an open ended chamber, said rigid tubular member having an axial length at least equal to the stroke of reciprocation of said piston in said pressure cylinder but not greater than the axial length of said reservoir tube, and a resilient tubular wall unit having an inner tubular wall sleeved over said reservoir tube with the free end thereof attached to said reservoir tube in fluid-tight engagement and an outer tubular wall sleeved over said open end of said tubular member with the free end thereof attached to said tubular member in fluid-tight engagement with said inner wall and said outer wall integrally connected by a rolling return bend wall portion formed by the inner and the outer wall on relative reciprocation therebetween whereby to close said open end of said chamber for receiving therein fluid under pressure, said resilient tubular wall unit having an unsupported tubular wall portion between said attached ends thereof with the shock absorber in full extended position that engages said reservoir tube in reciprocal rolling engagement and which has an axial length sufficient only for positioning of said return bend portion immediately adjacent said open end of said tubular member when the shock absorber is in fully collapsed position and for positioning of said return bend portion immediately adjacent said attachment of said inner wall to said reservoir tube when the shock absorber is in fully extended position whereby said rigid tubular member forms a major rigid wall portion separate from said resilient wall portion of greater axial length than the unsupported axial length of the resilient wall portion for said pressure receiving chamber when said shock absorber is in fully collapsed position and also when the shock absorber is in fully extended position.

3. A shock absorber and air spring unit assembly constructed and arranged in accordance with claim 2 wherein said reservoir tube has an annular recessed portion providing a wall formed in the contour of a truncated cone with the base end thereof positioned toward the open end of said rigid tubular member, said inner wall of said tubular wall unit having the free end engaging said truncated cone portion of said reservoir tube and frictionally secured thereon by a nonexpansible ring frictionally engaging said end wall of said tubular wall unit, said rigid tubular member having the free end thereof formed outwardly in the form of a truncated cone, said free end portion of said outer wall engaging said truncated cone portion on said rigid tubular member and attached thereto by a nonexpansible ring, internal fluid pressure in said fluid pressure chamber applied to said resilient tubular wall unit urging movement of the free ends thereof axially of the truncated portions engaged by the free ends of the said wall unit to increase frictional engagement with their respective wall portions in proportion to the increase in fluid pressure in said pressure receiving chamber.

References Cited in the file of this patent

UNITED STATES PATENTS

| 2,467,098 | Rossman | Apr. 12, 1949 |
| 2,916,296 | Muller | Dec. 8, 1959 |

FOREIGN PATENTS

| 214,922 | Australia | May 2, 1958 |
| 218,802 | Australia | Nov. 21, 1958 |